United States Patent
Li et al.

(10) Patent No.: US 7,320,838 B2
(45) Date of Patent: Jan. 22, 2008

(54) ELECTROLYTE CREEPAGE BARRIER FOR LIQUID ELECTROLYTE FUEL CELLS

(75) Inventors: Jian Li, Alberta (CA); Mohammad Farooque, Danbury, CT (US); Chao-Yi Yuh, New Milford, CT (US)

(73) Assignees: FuelCell Energy, Inc., Danbury, CT (US); The United States of America as represented by the United States Department of Energy, Washington, DC (US)

( * ) Notice: Subject to any disclaimer, the term of this patent is extended or adjusted under 35 U.S.C. 154(b) by 525 days.

(21) Appl. No.: 10/405,569

(22) Filed: Apr. 2, 2003

(65) Prior Publication Data

US 2003/0215691 A1    Nov. 20, 2003

Related U.S. Application Data

(63) Continuation-in-part of application No. 09/736,558, filed on Dec. 13, 2000, now abandoned.

(51) Int. Cl.
*H01M 2/08* (2006.01)
*H01M 2/16* (2006.01)
*H01M 2/18* (2006.01)

(52) U.S. Cl. .......................................... 429/34; 429/35

(58) Field of Classification Search ............. 429/34–37
See application file for complete search history.

(56) References Cited

U.S. PATENT DOCUMENTS

| 4,414,294 A | 11/1983 | Guthrie |
| 4,467,018 A | 8/1984 | Schroll |
| 4,548,874 A * | 10/1985 | Katz et al. ..................... 429/18 |
| 4,761,348 A | 8/1988 | Kunz et al. |
| 5,110,692 A | 5/1992 | Farooque et al. |
| 5,472,800 A | 12/1995 | Goto et al. |
| 5,478,663 A * | 12/1995 | Cipollini et al. .............. 429/35 |

* cited by examiner

*Primary Examiner*—Tracy Dove
(74) *Attorney, Agent, or Firm*—Cowan, Liebowitz & Latman, P.C.

(57) ABSTRACT

A dielectric assembly for electrically insulating a manifold or other component from a liquid electrolyte fuel cell stack wherein the dielectric assembly includes a substantially impermeable dielectric member over which electrolyte is able to flow and a barrier adjacent the dielectric member and having a porosity of less than 50% and greater than 10% so that the barrier is able to measurably absorb and chemically react with the liquid electrolyte flowing on the dielectric member to form solid products which are stable in the liquid electrolyte. In this way, the barrier inhibits flow or creepage of electrolyte from the dielectric member to the manifold or component to be electrically insulated from the fuel cell stack by the dielectric assembly.

17 Claims, 5 Drawing Sheets

ELECTROLYTE CREEPAGE BARRIER FOR LIQUID ELECTROLYTE FUEL CELLS

CROSS REFERENCE TO RELATED APPLICATIONS

This application is a continuation-in-part of U.S. patent application Ser. No. 09/736,558, filed Dec. 13, 2000 now abandoned.

STATEMENT AS TO RIGHTS TO INVENTIONS MADE UNDER FEDERALLY SPONSORED RESEARCH AND DEVELOPMENT

This invention was made with Government support under contract DE-FC21-95MC31184 awarded by the Department of Energy. The Government has certain rights in the invention.

BACKGROUND OF THE INVENTION

This invention relates to dielectric assemblies and, in particular, to dielectric assemblies for electrically isolating manifolds and other components, from a liquid electrolyte fuel cell stack.

In a carbonate (liquid electrolyte) fuel cell stack with external manifolds for gas supply and discharge, the manifolds are electrically isolated from the fuel cell stack by a dielectric member in the form of a picture frame. The dielectric frame must be capable of operating at a voltage difference of between 100 and 1000 volts depending on the number of cells in a stack and the electrical configuration of the stacks when arranged in a power plant. A dielectric frame formed of substantially impermeable $Al_2O_3$ (porosity of less than 5% and mean pore size of less than 10 um) has been found capable of providing electrical isolation to thousands of volts.

However, at the fuel cell operating temperature of 650° C., the liquid electrolyte in the fuel cell stack tends to creep over the surface of the dielectric frame. The frame and the stack are only separated by a thin porous gasket (porosity of greater than 70% and mean pore size of greater than 10 um) for gas sealing. This porous gasket becomes filled with electrolyte and as the dielectric frame comes in contact with the liquid electrolyte, the frame becomes wetted.

Once this occurs, a thin continuous layer of conductive liquid electrolyte film forms on the surface of the dielectric. The liquid electrolyte will then flow onto the manifold adjacent the frame. This will occur directly, if the frame and manifold are in direct contact, or through a thin porous gasket (porosity of greater than 70% and mean pore size of greater than 10 um), if such a gasket is used between the frame and manifold. In either case, the electrical isolation provided by the dielectric frame can be compromised and can lead to stack malfunction.

As a result, designers of these frames have looked to develop techniques to prevent or reduce the electrolyte creepage wetting. The aim of these designers is to realize a dielectric assembly able to provide stable long-term dielectric insulation of the liquid electrolyte fuel cell stack from the metallic manifold.

It is, therefore, an object of the present invention to provide a dielectric assembly which overcomes the above disadvantages.

It is a further object of the present invention to provide a dielectric assembly which exhibits increased resistance to dielectric creepage.

SUMMARY OF THE INVENTION

In accordance with the principles of the present invention, the above and other objects are realized in a dielectric assembly for electrically insulating a manifold or other component from a liquid electrolyte fuel cell stack wherein the dielectric assembly includes a substantially impermeable dielectric member over which electrolyte is able to flow and a barrier adjacent the dielectric member and having a porosity of less than 50% and greater than 10% so that it is able to measurably absorb and chemically react with the liquid electrolyte flowing on the dielectric member to form solid products which are stable in the liquid electrolyte. In this way, the barrier inhibits flow or creepage of electrolyte from the dielectric member to the manifold or component to be electrically insulated from the fuel cell stack by the dielectric assembly.

BRIEF DESCRIPTION OF THE DRAWINGS

The above and other features and aspects of the present invention will become more apparent upon reading the following detailed description in conjunction with the accompanying drawings, in which.

DESCRIPTION OF THE INVENTION

Figure 1:
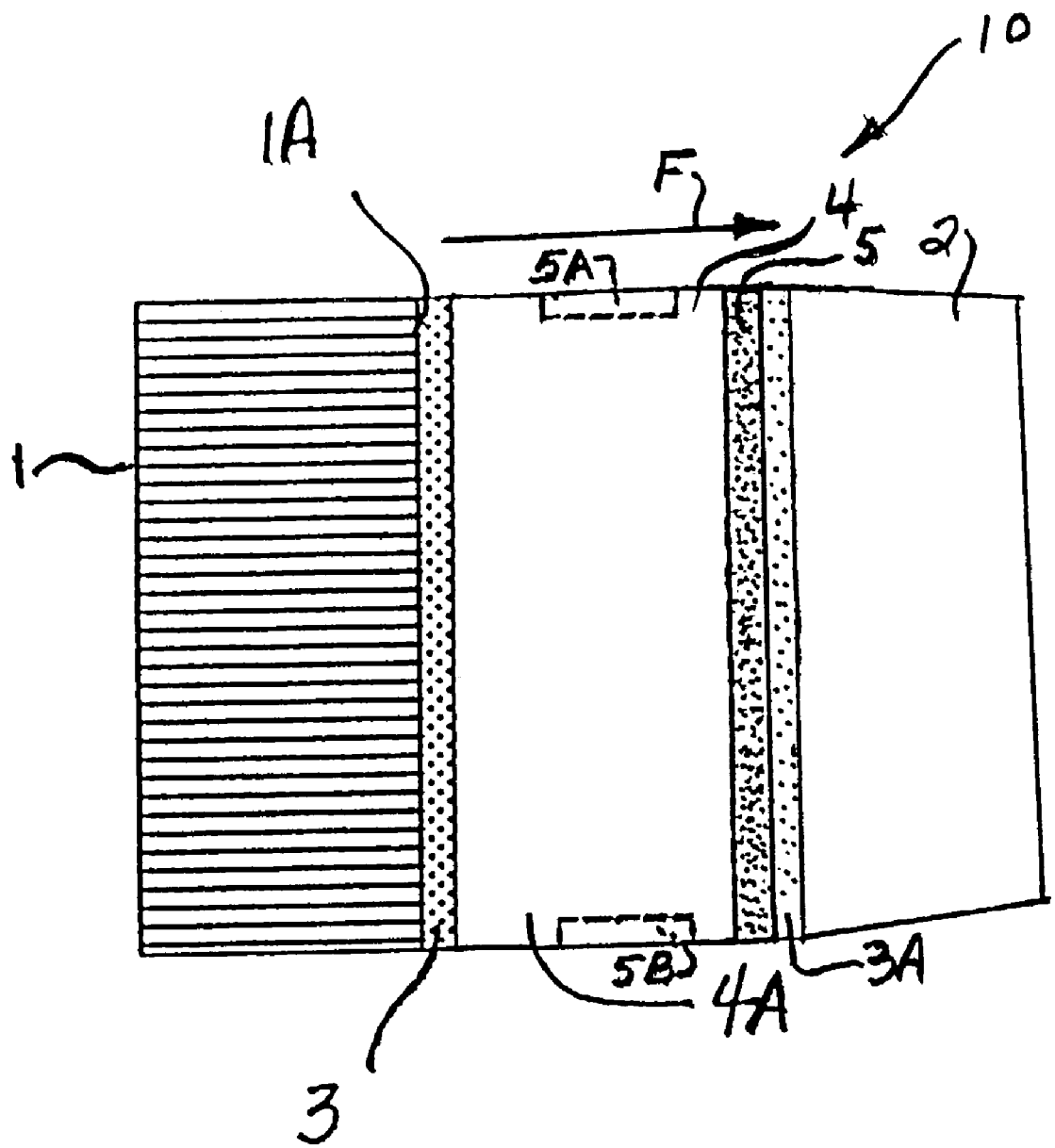
FIG. 1 shows a fuel cell stack incorporating a dielectric assembly having a barrier in accordance with the principles of the present invention.

FIG. 1 shows a fuel cell stack system 10 in which a metallic manifold 2 faces a face 1A of a fuel-cell stack 1. The manifold 2 can either serve to input gas or to extract gas from the stack 1.

Situated between the stack 1 and the manifold 2 are a gasket 3, a dielectric assembly 4 and a gasket 3A. The gasket 3 contacts the face 1A of the stack, while the dielectric assembly 4 is situated between the gasket 3 and the gasket 3A, the latter gasket contacting the manifold 2.

Figure 9:
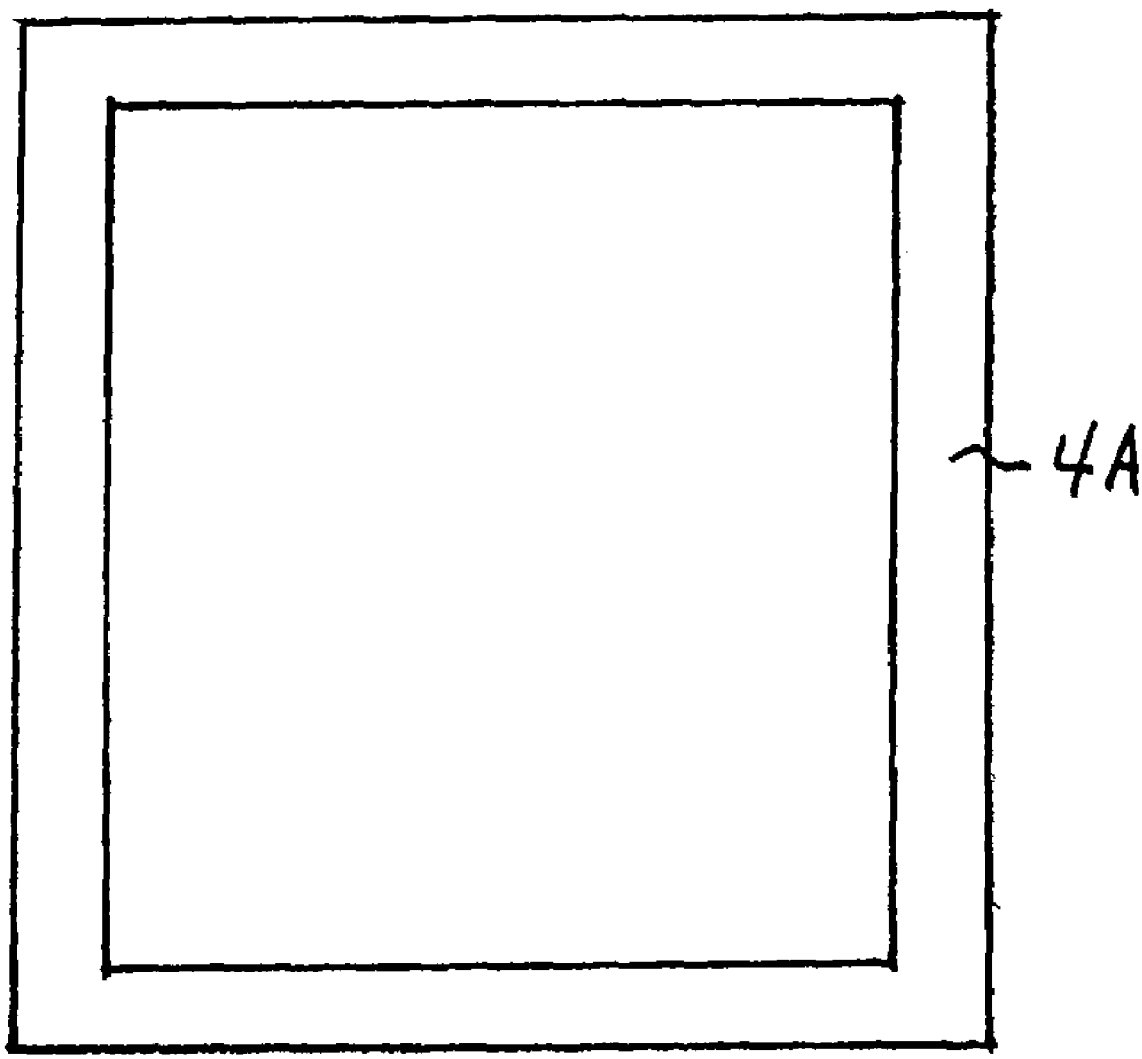
FIG. 9 shows the dielectric member of the dielectric assembly of FIG. 1 formed as a picture frame.

The dielectric assembly 4 comprises an impermeable dielectric member 4A which, typically, may have the form of a picture frame, as shown in FIG. 9. The gaskets 3 and 3A are typically highly porous members with porosities greater than 70% and mean pore sizes greater than 10 um.

With the dielectric assembly 4 formed as above-described, over time, electrolyte from the fuel-cell stack 1 will pass though the porous gasket 3, flow over the impermeable dielectric member 4A and through the porous gasket 3A to the manifold 2. This flow or movement of electrolyte over the path F shown in FIG. 1 compromises the ability of the dielectric assembly 4 to electrically isolate the fuel-cell stack from the metallic manifold 2.

Figure 2:
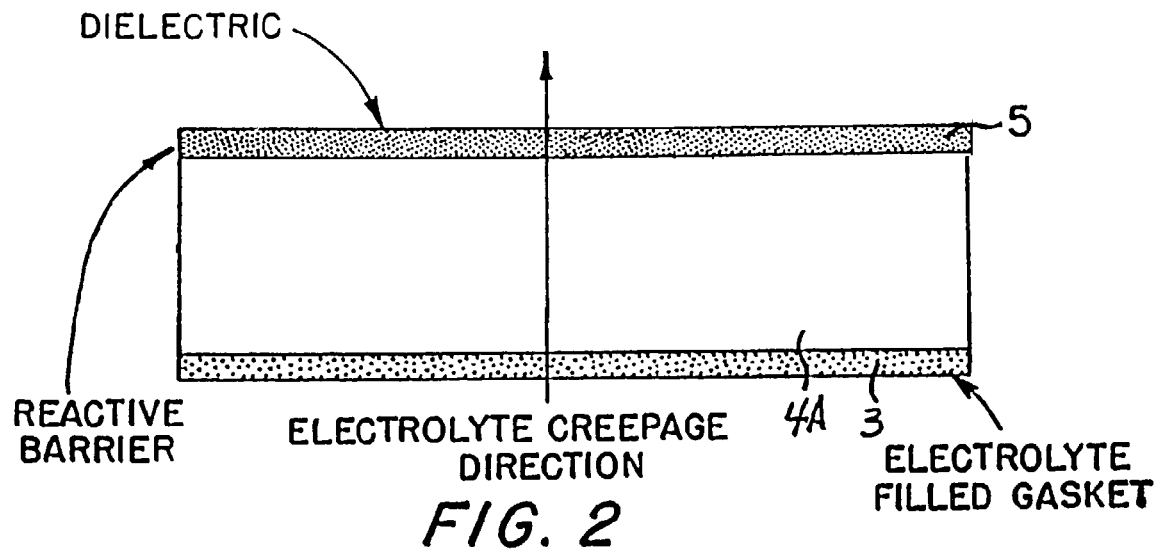
FIG. 2 illustrates schematically in greater detail one form of the dielectric assembly of FIG. 1.

In accordance with the invention, the dielectric assembly 4 is further adapted to reduce or retard the electrolyte flow, so as to enhance the ability of the assembly to electrically isolate the metallic manifold 2 from the stack 1. As shown in FIGS. 1 and 2, this is realized by including in the dielectric assembly 4 a barrier 5 which is situated so as to be in the flow path F of the liquid electrolyte flowing from the stack 1 through the gasket 3 and over the dielectric member 4A.

More particularly, in accord with the invention, the barrier 5 is formed to have a porosity which is greater than 10% and less than 50% and a mean pore size which is less than 10 um so that the barrier is able to measurably absorb and chemically react with the liquid electrolyte (e.g., carbonate electrolyte) of the stack 1 to produce solid products which are stable in the electrolyte. As can be appreciated, the production of these products inhibits the flow of the electrolyte along the surface of the dielectric member 4A. As a result, electrolyte creepage is reduced and the electrical insulating characteristics of the dielectric member are preserved.

The material used for the barrier 5 is preferably a ceramic material. One ceramic material found usable is calcium aluminate cement (Secar, available from LaFarge Corp.) At 650° C., Secar formed to have the above-mentioned porosity and mean pore size quickly reacts with $Li_2CO_3$ to form solid products consisting of $LiAlO_2$, CaO and $K_2CO_3$. These products are chemically stable in the liquid electrolyte (molten carbonate) environment. Another material is $\gamma$-$Al_2O_3$. Further common materials, such as $MgAl_2O_4$ powder and $CaAl_2O_4$ powder, can also be used.

The effectiveness of the above-mentioned materials as barriers depends not only on the chemical nature, mean pore size and porosity of the materials used, but also on the amount of the material used. A typical thickness used for the barrier 5 may be the same as that used for the gaskets 3 and 3A, i.e., about 0.1 inches, as is shown in FIG. 1. However, a barrier of lesser or greater thickness can also be used. As long as the barrier 5 includes sufficient reactive material, the electrolyte from the stack 1 will not creep over the entire surface of the dielectric member 4A so as to be able to reach the manifold 2.

EXAMPLE 1

Figure 3:
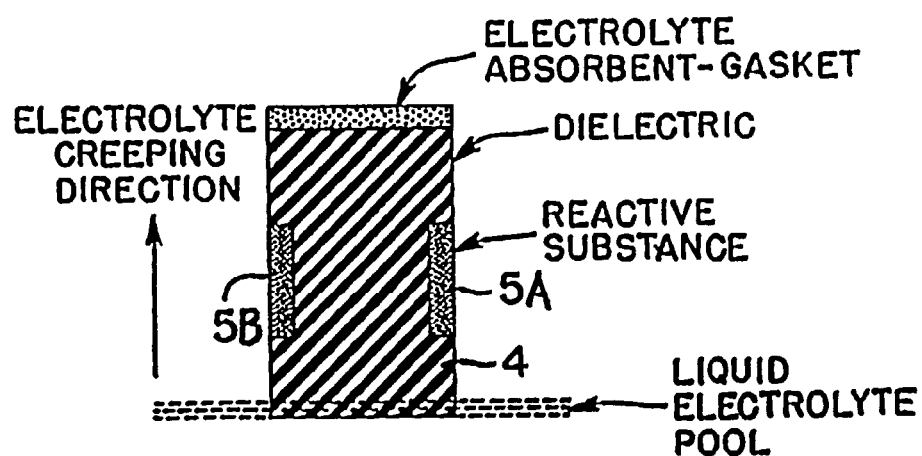
FIG. 3 shows a test configuration for testing a dielectric assembly having a barrier in accordance with the principles of the present invention.

A dielectric assembly using a barrier 5 comprised of Secar (mechanical mixtures of $Al_2O_3$ and CaO) having a porosity of 45% and a mean pore size of 0.1 um was fabricated. The dielectric member of the assembly comprised a grooved $Al_2O_3$ rectangular bar in a dimension of 4"×1"×0.625" with Ra 29 surface finishing (Ra: the average deviation of the profile from the mean line, in μ-inch). The Secar was embedded in grooves on both sides of the bar, as shown in FIG. 3. Each groove had a depth of 0.125 inches.

Figure 4:
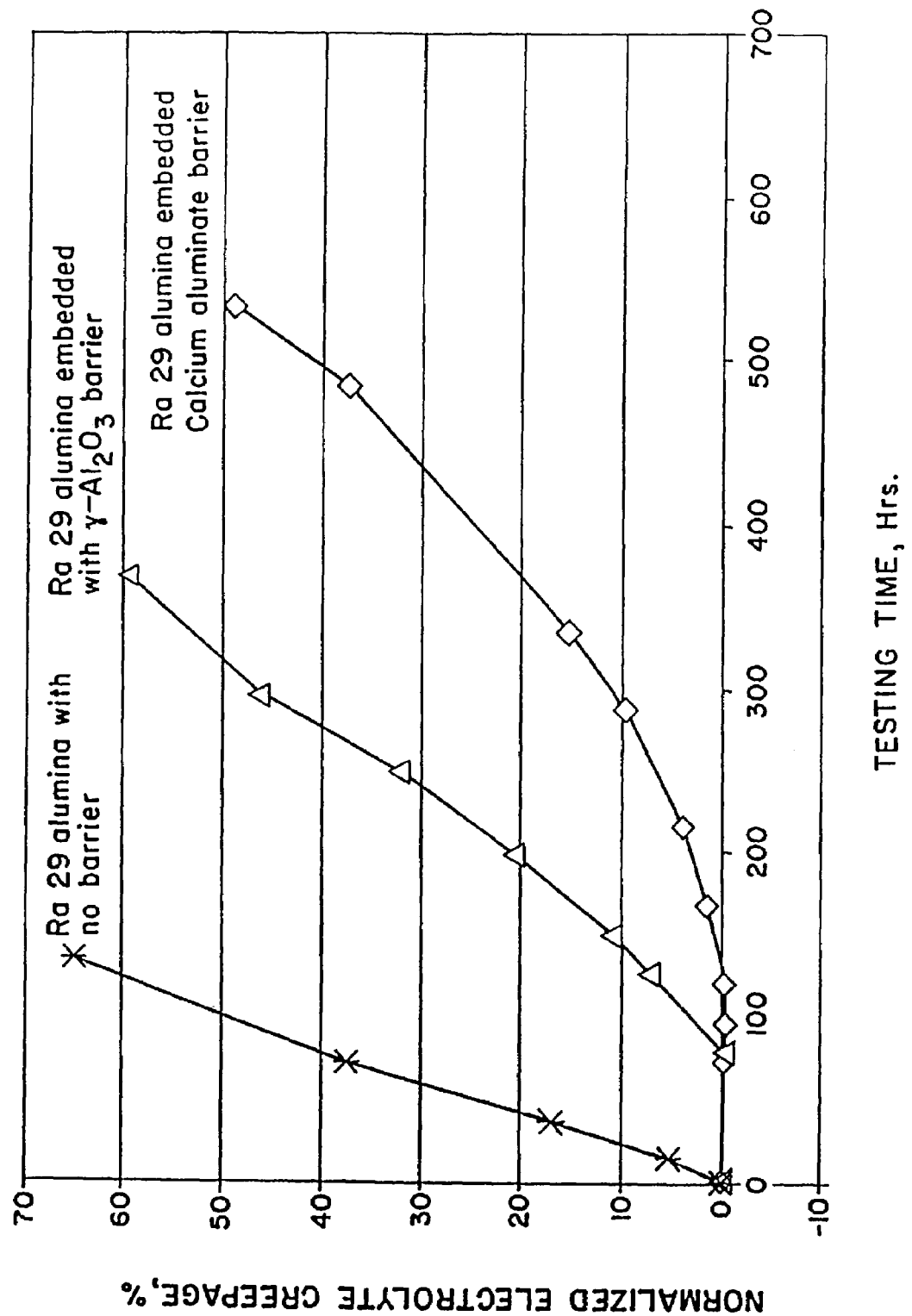
FIG. 4 shows test results for a dielectric assembly of FIG. 3.

The effect of Secar as a reactive barrier was then evaluated in an accelerated electrolyte pool test. In the test, the bottom of the dielectric member was submerged in a liquid electrolyte pool (infinite electrolyte supply), and a piece of gasket, serving as electrolyte absorbent, was laid on the top surface to collect the creeping electrolyte. The results from this test are shown in FIG. 4, and demonstrate that the production of reaction products caused significant delay in electrolyte creepage.

EXAMPLE 2

A dielectric assembly 4 as shown in FIG. 3 was formed in this case with the barrier comprised of $\gamma$-$Al_2O_3$ powder formed into a layer having a porosity of 45%, a mean pore size of 0.1 um and a thickness of 0.05 inches. This assembly was similarly tested as described in Example 1 and the results are also shown in FIG. 4. These results similarly indicate that the barrier caused significant reduction in electrolyte creepage.

EXAMPLE 3

Figure 7:
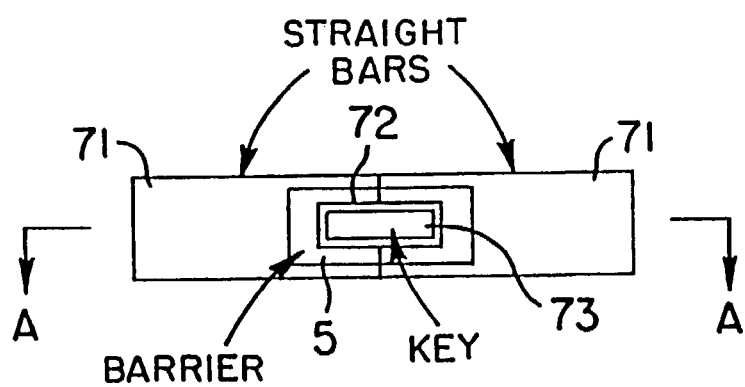
FIGS. 7 and 8 illustrate application of the invention to a dielectric frame.
Figure 8:
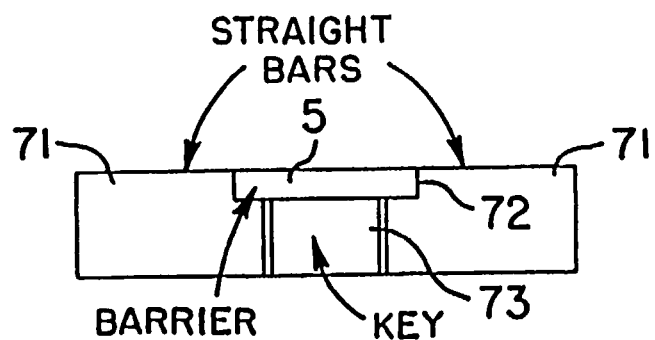

In a liquid carbonate fuel cell stack, a dielectric frame as described in the U.S. Pat. No. 4,414,294 may be employed. This dielectric frame, as shown in FIGS. 7 and 8, includes straight segments 71 which are connected at joints. The joint area, shown as forming a keyway 72 in FIGS. 7 and 8, has the highest liquid electrolyte creepage due to increased creepage surfaces in the joint and possible capillaries formed between the straight bars and the connecting key 73 inserted in the keyway 72. A barrier 5 made of Secar cement with a porosity of 45% and a mean pore size of 0.1 um, and with a dimension 1.50"×0.625"×0.031", was placed at the top of the joint area on the surface facing the manifold in a 250 kW molten carbonate fuel stack (340) cells. In approximately 12,000 hours of operation, the barrier partially reacted with the liquid electrolyte, and no electrolyte crossed the barrier and reached the manifold. This example confirmed the effectiveness of the use of a dielectric assembly of the invention in actual fuel cell operation.

Figure 5:
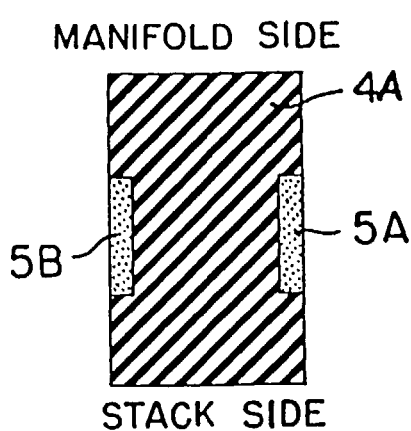
FIGS. 5 and 6 show further configurations for the dielectric assembly of FIG. 1.
Figure 6:
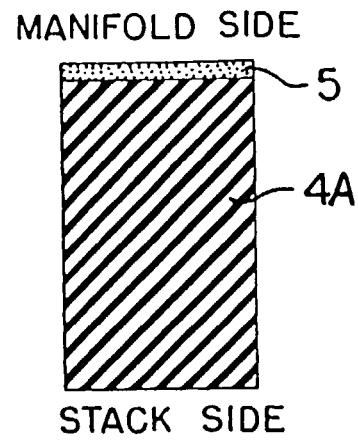

FIG. 5 illustrates a different configuration for the dielectric member 4A and the barrier 5. In FIG. 5, the barrier 5 comprises barrier inserts 5A and 5B which are embedded in the sides of the dielectric member 4A. In FIG. 6, as in FIGS. 1 and 2, the barrier 5 comprises a layer situated on the surface of the member 4A facing the manifold 2. The barrier configuration in FIG. 5 is also shown in dotted line in FIG. 1. In the dielectric member 4A of FIG. 5, the presence of the barriers 5A and 5B results in reducing electrolyte flow and, thereby prolonging dielectric life.

Also, it in accord with the invention, other configurations or combinations of the barriers 5 can be used. Thus, an alternative configuration might use only one of the side barriers 5A and 5B. Another alternative configuration might use one or more of the side barriers 5A and 5B with the addition of a barrier 5 situated on the surface of the member 4A facing the manifold 2.

The barriers 5, 5A and 5B of the invention can be fabricated by various processes. Thus, the barriers can be formed with high temperature ceramic binders using a painting or a casting process. They can also be formed by the standard tape casting technique.

In all cases it is understood that the above-described arrangements are merely illustrative of the many possible specific embodiments which represent applications of the present invention. Numerous and varied other arrangements can be readily devised in accordance with the principles of the present invention without departing from the spirit and scope of the invention.

What is claimed is:

1. A liquid electrolyte fuel cell system comprising:
   a liquid electrolyte fuel cell stack;
   a manifold member facing a surface of said liquid electrolyte fuel cell stack;
   a dielectric assembly situated between said manifold member and said surface of said liquid electrolyte fuel cell stack, said dielectric assembly including a substantially impermeable dielectric member over which electrolyte is able to flow and a barrier adjacent the dielectric member and having a porosity of less than 50% and greater than 10% so that the barrier is able to measurably absorb and chemically react with the liquid electrolyte flowing on the dielectric member to form solid products which are stable in the liquid electrolyte, said dielectric member including: opposing surfaces adapted to face, respectively, the manifold and the fuel-cell stack; and opposing sides connecting the opposing surfaces; and said barrier including at least one of a first barrier segment embedded in one of the opposing sides of said dielectric member and a second barrier segment embedded in the other of the opposing sides of said dielectric member.

2. A liquid electrolyte fuel cell system in accordance with claim 1, wherein:

said liquid electrolyte is carbonate.

3. A liquid electrolyte fuel-cell system in accordance with claim 1, further comprising:

a first porous gasket situated between said face of said fuel-cell and said dielectric assembly.

4. A liquid electrolyte fuel-cell system in accordance with claim 3, further comprising:

a second porous gasket situated between said dielectric assembly and said manifold.

5. A liquid electrolyte fuel-cell system in accordance with claim 4, wherein:

each of said first and second gaskets has a porosity greater than 70% and a mean pore size greater that 10 um.

6. A liquid electrolyte fuel-cell system in accordance with claim 1, wherein said barrier comprises a ceramic material.

7. A liquid electrolyte fuel-cell system in accordance with claim 6, wherein:

said dielectric member comprises a ceramic material.

8. A liquid electrolyte fuel-cell system in accordance with claim 1, wherein:

said barrier comprises one of $CaAl_2O_4$, $MgAl_2O_3$, $Al_2O_3$ and calcium aluminate cement.

9. A liquid electrolyte fuel-cell system in accordance with claim 1, wherein:

said dielectric member has the shape of a frame.

10. A liquid electrolyte fuel-cell system in accordance with claim 1, wherein:

said barrier includes said first and second barrier segments embedded, respectively, in the one and other opposing sides of said dielectric member.

11. A liquid electrolyte fuel-cell system in accordance with claim 10, wherein:

said barrier further comprises a barrier layer disposed on the surface of said dielectric member adapted to face said manifold.

12. A liquid electrolyte fuel-cell system in accordance with claim 10, wherein:

said dielectric member has the shape of a frame.

13. A liquid electrolyte fuel cell system in accordance with claim 1, wherein:

said dielectric member has the shape of a frame; and said frame includes a plurality of segments joined at a joint and said barrier is situated in the area of said joint.

14. A liquid electrolyte fuel-cell system in accordance with claim 13, wherein:

said joint includes a keyway area for receiving a key for joining said segments.

15. A liquid electrolyte fuel cell system in accordance with claim 14, wherein: said barrier is on the surface of the keyway area facing the manifold.

16. A liquid electrolyte fuel-cell system comprising:

a liquid electrolyte fuel cell stack;

a manifold member facing a surface of said liquid electrolyte fuel cell stack;

a dielectric assembly situated between said manifold member and said surface of said liquid electrolyte fuel cell stack, said dielectric assembly including a substantially impermeable dielectric member over which electrolyte is able to flow and a barrier adjacent the dielectric member and having a porosity of less than 50% and greater than 10% so that the barrier is able to measurably absorb and chemically react with the liquid electrolyte flowing on the dielectric member to form solid products which are stable in the liquid electrolyte, said dielectric member has the shape of a frame; and said frame includes a plurality of segments joined at a joint, said joint including a keyway for receiving a key for joining said segments and said barrier is situated only on a surface of the keyway.

17. A liquid electrolyte fuel-cell system in accordance with claim 16, wherein: said barrier is on the surface of the keyway facing the manifold.

* * * * *

UNITED STATES PATENT AND TRADEMARK OFFICE
CERTIFICATE OF CORRECTION

| | | |
|---|---|---|
| PATENT NO. | : 7,320,838 B2 | Page 1 of 1 |
| APPLICATION NO. | : 10/405569 | |
| DATED | : January 22, 2008 | |
| INVENTOR(S) | : Jian Li et al. | |

It is certified that error appears in the above-identified patent and that said Letters Patent is hereby corrected as shown below:

Column 6, line 39, delete "only on a surface of the keyway." and insert -- only on said joint and on a surface of the keyway. --

Signed and Sealed this

Seventh Day of October, 2008

JON W. DUDAS
*Director of the United States Patent and Trademark Office*